United States Patent
Lammers

(10) Patent No.: US 7,310,221 B2
(45) Date of Patent: Dec. 18, 2007

(54) SWITCHING INSTALLATION PROVIDED WITH AN ELECTRICALLY INSULATING BARRIER

(75) Inventor: Arend Jan Willem Lammers, Hengelo (NL)

(73) Assignee: Eaton Electric N.V., Hengelo (NL)

( * ) Notice: Subject to any disclaimer, the term of this patent is extended or adjusted under 35 U.S.C. 154(b) by 571 days.

(21) Appl. No.: 10/514,156

(22) PCT Filed: May 13, 2003

(86) PCT No.: PCT/NL03/00349

§ 371 (c)(1),
(2), (4) Date: Nov. 12, 2004

(87) PCT Pub. No.: WO03/096504

PCT Pub. Date: Nov. 20, 2003

(65) Prior Publication Data

US 2006/0034037 A1    Feb. 16, 2006

(30) Foreign Application Priority Data

May 13, 2002   (NL) .................................. 1020581

(51) Int. Cl.
*H02B 1/14*      (2006.01)

(52) U.S. Cl. ...................... 361/632; 361/601; 361/605; 361/643; 361/647; 361/652; 218/67; 218/118; 218/134; 200/50.22; 200/50.26; 200/82 B; 200/400

(58) Field of Classification Search .................. 361/42, 361/47, 600–607, 618–625, 634–641, 647, 361/652–658; 200/50.21–50.26, 50.32, 400, 200/1 R, 401, 428, 82 B; 218/55, 67, 68, 218/97, 118, 120, 134, 138, 155, 80–84; 335/9, 202
See application file for complete search history.

(56) References Cited

U.S. PATENT DOCUMENTS 4,876,424 A * 10/1989 Leone et al. ................. 200/306
(Continued)

FOREIGN PATENT DOCUMENTS

CH           200 798 A       10/1938
(Continued)

OTHER PUBLICATIONS

Jaenicke L-R: "Vakuumschaltkammer Mit Feldsteurndem Isolierstoffmantel" Technik Report, Siemens AG., Erlangen, DE, vol. 3, No. 6, Jan. 2000; p. 60, XP000935859, ISSN: 1436-777.

*Primary Examiner*—Michael Datskovskiy
(74) *Attorney, Agent, or Firm*—Kirk D. Houser; Eckert Seamans Cherin & Mellott, LLC

(57) ABSTRACT

A switching installation (5) having a circuit breaker (12), which is connected to a cable connection (33), and optionally a disconnector (14) for making or breaking a conductive connection between the cable connection (33) and a rail system (15), and an electrically insulating barrier (10). The electrically insulating barrier (10) surrounds at least the parts which are under electric voltage in operation from the circuit breaker (12) to the rail system (15), including a branch (18) leading to a rail (15) of the rail system, separately for each phase of the switching installation (5). Furthermore, inside the electrically insulating barrier (10) the switching installation may be provided with field-control means and/or voltage-sealing means (22, 25, 37).

20 Claims, 4 Drawing Sheets

U.S. PATENT DOCUMENTS

| | | | |
|---|---|---|---|
| 5,194,840 A * | 3/1993 | Frutuoso et al. | 335/202 |
| 5,497,287 A * | 3/1996 | Yee et al. | 361/617 |
| 5,910,757 A * | 6/1999 | Broghammer et al. | 335/9 |
| 5,917,167 A * | 6/1999 | Bestel | 218/138 |
| 6,504,125 B2 * | 1/2003 | Nishitani | 218/68 |
| 6,559,404 B1 * | 5/2003 | Ookawa et al. | 218/155 |
| 6,753,493 B2 * | 6/2004 | Rhein et al. | 218/120 |
| 6,852,939 B2 * | 2/2005 | Rhein et al. | 218/154 |
| 6,897,396 B2 * | 5/2005 | Ito et al. | 218/120 |

FOREIGN PATENT DOCUMENTS

| | | |
|---|---|---|
| DE | 15 90 968 A | 4/1970 |
| DE | 25 36 904 A | 2/1977 |
| EP | 0 681 352 A | 11/1995 |
| EP | 1 107 409 A | 6/2001 |
| JP | 62 77806 A | 4/1987 |

* cited by examiner

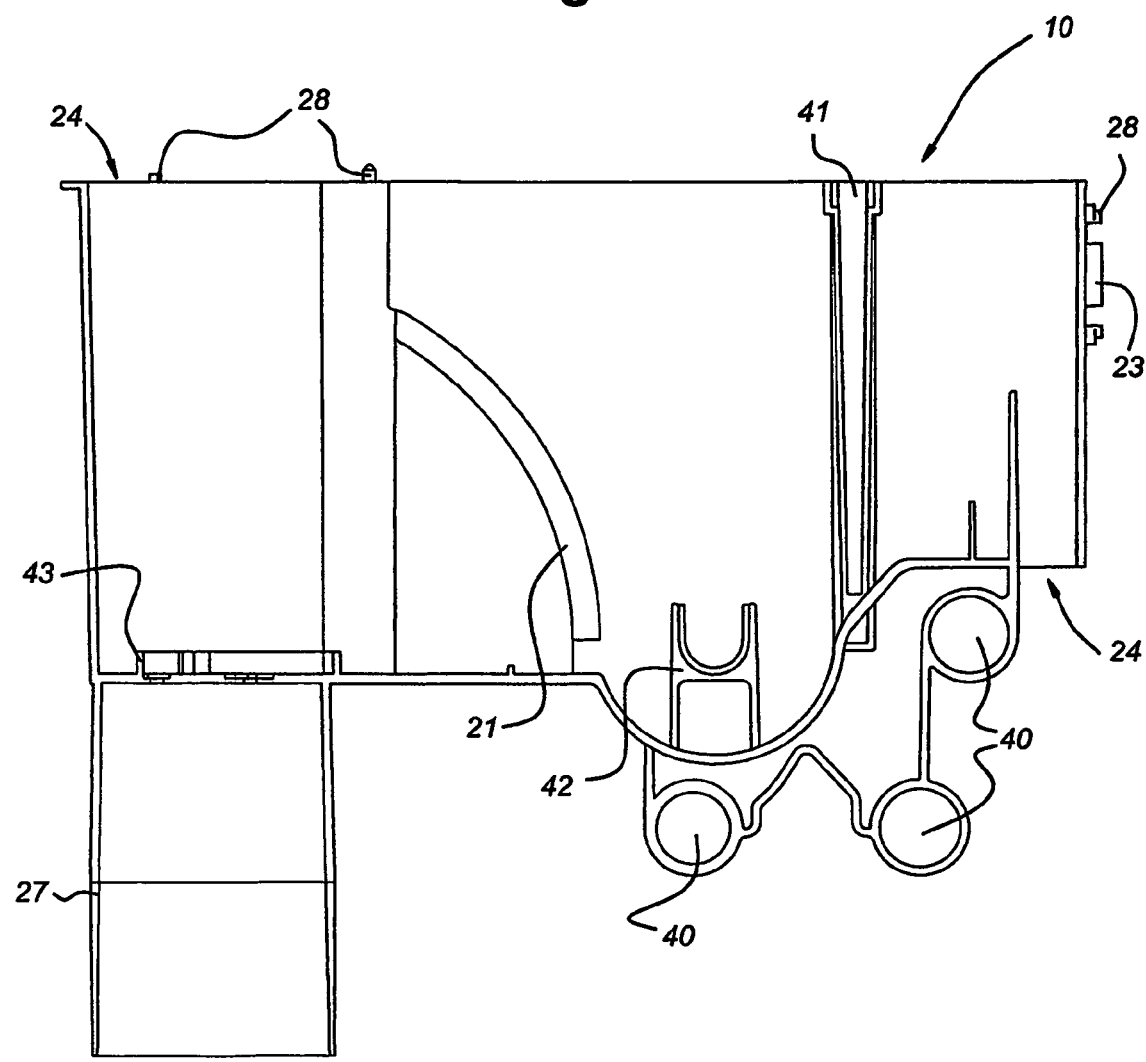

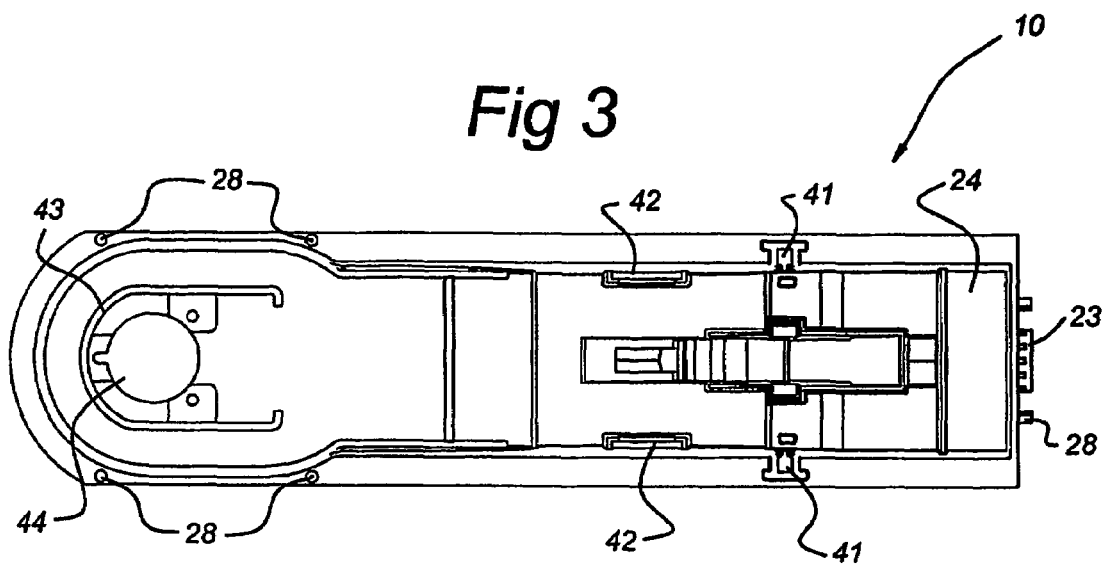
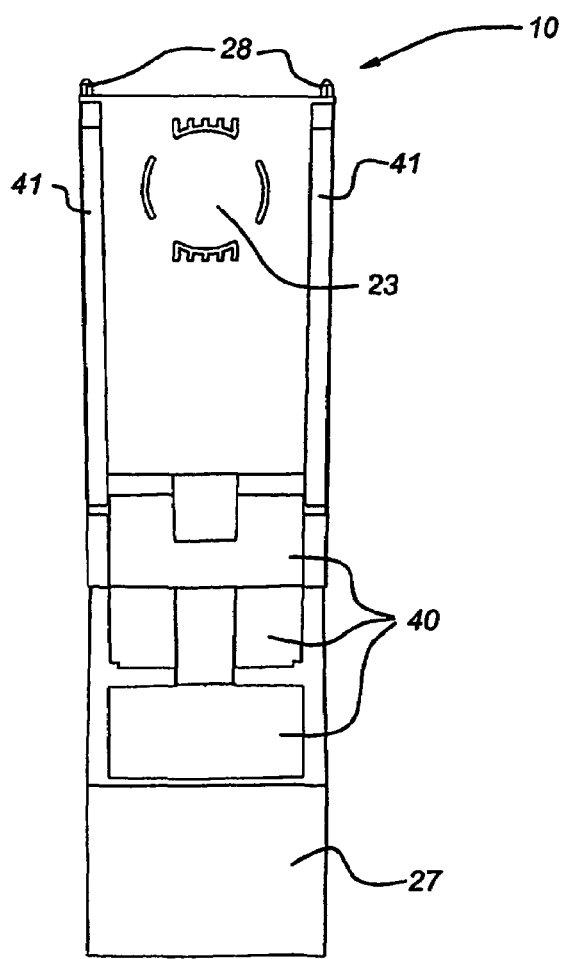

SWITCHING INSTALLATION PROVIDED WITH AN ELECTRICALLY INSULATING BARRIER

BACKGROUND OF THE INVENTION

1. Field of the Invention

The present invention relates to a switching installation, suitable in particular for voltages of over 1000 V, comprising a circuit breaker, which is connected to a cable connection, and optionally a disconnector for making or breaking a conductive connection between the cable connection and a rail system, and an electrically insulating barrier for shielding an element of the switching installation which is under voltage in operation.

More in particular, this invention relates to a switching installation according to the preamble of claim 1.

2. Background Information

Such a switching installation is known from patent publication CH-A-200 798.

Since most switching installations are of three-phase design, there are also three of each of the abovementioned components per functional unit (also referred to as a field), these components being physically and electrically separated from one another for each phase.

Furthermore, the phases of a switching installation of this type are generally accommodated as a physical entity in a surrounding switchbox, in which, on account of the considerable differences in potential, a certain distance has to be maintained between the various voltage-carrying parts and other electrically conductive parts of the switch cabinet, in order to prevent an electrical sparkover or breakdown between these various parts. As well as the voltage used, this distance is also dependent on the type of circuit breaker used, such as for example air circuit breakers, oil circuit breakers, vacuum circuit breakers, etc. and on the insulation medium used between the various parts of the switching installation, such as for example gas (air, SF6, and the like), liquid (oil), solid (casting resin), etc.

On account of the space taken up and also on account of the higher materials and transport costs, it is aimed to make switching installations as compact as possible, and a combination of circuit breakers and insulating media are used to enable a compact design to be achieved. For example, the combination of vacuum circuit breakers with SF6 insulation is in widespread use in order to obtain a compact switching installation. Although there is a desire to move away from SF6 as insulation medium, on account of the negative consequences for the environment, this gas is nevertheless still in widespread use, since there are insufficient alternatives available in particular with a view to achieving the compact design.

A switching installation which is based on the object of providing a compact design is known, for example, from American Patent Application US-A-2001/0005306, which describes a switching installation with a cable connection and a rail system, between which there is a vacuum circuit breaker by means of which a cable and a rail can be connected to one another. The installation also comprises a drive mechanism and a means for disconnecting cable and rail from one another by means of a disconnector, as well as a grounding feature. The installation disclosed comprises a number of compartments, such as a cable compartment, a rail compartment and a switching compartment. Use is made of insulating walls in the switching installation in order to electrically shield specific components from other specific components.

The known switching installation has the drawback that, on account of the high voltages which are to be used at various parts of the switching installation, a considerable dimension is required if air is to ensure sufficient electrical insulation. A number of insulating walls are also used, but not for all the relevant components of the switching installation. Furthermore, the known switching installation requires considerable work to set it up.

Furthermore U.S. Pat. No. 4,879,441 has disclosed a switching installation in which use is made of a dielectric barrier comprising an insulating plate which is bent in such a manner that three sides which are perpendicular to one another are formed. The plate formed in this way is secured around each vacuum circuit breaker for each phase, in such a manner that the vacuum circuit breakers and a part of the drive rod are surrounded on three sides by said plate, the open sides of the insulating plate being located on the front, top and bottom sides.

The addition of a barrier of this type ensures that the dielectric strength between specific parts is increased, with the result that either a higher voltage or shorter distance between said parts having a different voltage potential can be used.

Although the addition of the known dielectric barrier achieves a significant improvement, further improvement is still possible, in particular with regard to the compactness of the switching installation.

Therefore, it is an object of the present invention to provide a switching installation which has a dielectric shielding which is such that optimum compactness and a simple assembly of components of the switching installation as a whole is made possible without it being necessary to use the insulating medium SF6, despite the known fact that the dielectric strength of SF6 is greater than that of air.

SUMMARY OF THE INVENTION

For this purpose, the present invention provides a switching installation as defined in claim 1

The electrically insulating barrier protects the other phases and the surrounding switch cabinet from voltage sparkovers or breakdowns from the parts which are under voltage. Furthermore, the electrically insulating barrier is also designed in such a manner that the voltage-sealing and/or field-controlling means are easy to arrange at the location of the branch of the rail system and to be held in this position, and for this purpose the electrically insulating barrier comprises slots on the inner side for receiving voltage-sealing and/or field-controlling means at the location of the branch, the slots also being designed to receive insulating support sections for securing the branch in a fixed position and retaining the voltage-sealing and/or field-controlling means. The voltage-sealing means are preferably designed as shielding caps which surround the branch rail. These caps are matched to the field-control means at the location of the breakable connection to the rail branch in such a manner that the shielding caps do not have to be designed to be completely airtight.

It is also possible for actuating members for the circuit breaker and the optional disconnector to be surrounded by the electrically insulating barrier. As a result of the electrically insulating barrier surrounding all the elements of each phase of a switching installation which are of relevance in this respect, a sufficient and operationally reliable electrically insulating action is produced between the different phases of the switching installation and between the elements of one phase of the switching installation and the generally metallic casing of the switching installation. This allows the switching installation to be of more compact design.

Although the invention now makes it possible to achieve a more compact switching installation, on account of the fact that a possible sparkover or breakdown between the different phases or between the phases and the switch cabinet is prevented by the electric barrier, there are also components which may have considerable potential differences with respect to one another inside said electrically insulating barrier. Moreover, these potential differences may fluctuate considerably for each component as a result of the switching operations, for example as a result of the circuit being grounded on one side of the switching component, for example a vacuum circuit breaker. To cope with this problem, it is possible to maintain a sufficient distance between the various components. However, this could lead to a less compact design of the switching installation.

Therefore, it is a further object of the present invention to further increase the compactness of the switching installation, and for this purpose the present invention provides an electrically insulating barrier in which the parts between circuit breaker and rail system, including the circuit breaker and the branch, which are positioned in said barrier and are under voltage are provided with field-control means and/or voltage-sealing means at the locations where the highest potential differences with associated high field strength density occur and/or at the locations where the distance between parts with a high potential difference is such that sparkovers may occur.

By suitably selecting the location and the means, it is possible for locations which, under certain circumstances, have considerable potential differences to be positioned closer to one another, so that the compactness is further increased.

According to one embodiment of the invention, the electric field distribution within the electrically insulating barrier is optimized and the field-control means and/or voltage-sealing means are positioned at the location where the actuating member is secured to the circuit breaker, at the location of a connection between the circuit breaker and the disconnector, at the location where the actuating member is secured to the disconnector, at the location of a breakable connection between the disconnector and the branch, at the location of a connection of the circuit breaker to the electrically insulating barrier, and/or at the location of the branch leading to the rail. Said field-control means and/or voltage-sealing means are preferably matched to one another in such a manner that electrons seeking to escape past the voltage-sealing means reach locations where a field-free space has been created with the aid of the field-control means. This has the advantage that at these locations it is possible to make do with voltage-sealing means which do not per se have to completely close off all the creeping paths, since the electrons are trapped by the field-free space.

Furthermore, the field-control means are preferably provided with an electrically insulating outer layer. This has the advantage that the field-control means can be positioned more closely together without there being any risk of sparkovers, since the possible routes of a sparkover are located in the field-free space and are therefore shielded In one embodiment, the electrically insulating barrier is produced as a complete unit, for example as an (injection) molding. This is easy to produce and process using known techniques. In a further embodiment, the insulating material of the electrically insulating barrier is optically transparent. This makes it possible to define inspection windows at one or more locations for visual checking of, for example, the position of the circuit breaker and/or disconnector (directly or indirectly via the position of their actuating members) inside the electrically insulating barrier.

By designing the electrically insulating barrier for each phase of a switching installation as a complete unit, the invention furthermore makes it possible to exploit not only the electrical (insulating and field-controlling) function but also a mechanical and design function. This second function enables both the various components and elements of the phases to be positioned and assembled with respect to one another and the various components and elements of the phases to be positioned and assembled in a fixed location with respect to the surrounding switch cabinet. To position each phase in the switch cabinet, the shape of the electrically insulating barrier is, for example, designed in such a manner that it can be secured in a closely fitting manner around the (vacuum) circuit breaker. For a close fit around the (vacuum) circuit breaker, it is preferable to use a flexible liner made from a material (for example rubber) which has both good electrically insulating properties and good mechanical properties, so that the required securing can be combined with the voltage sealing.

To make it possible to use vacuum circuit breakers of different diameters without the electrically insulating barrier in each case having to be matched to this diameter, the invention provides for the electrically insulating barrier to be secured to the same securing means by which the vacuum circuit breaker is secured in the surrounding switch cabinet. By adjusting the thickness of the flexible liner, it is then possible to obtain good securing in both electrical and mechanical terms.

Furthermore, the electrically insulating barrier may be provided with securing means on one or more sides of the barrier. For example, a drive mechanism for the actuating means of the circuit breaker and the disconnector can be secured to the top side of the electrically insulating barrier. Securing means on a front side of the barrier enable the latter to be secured to a surrounding box of the switching installation. It is also preferable for the securing means on the front side to be combined with an inspection window in the switchbox.

In a further embodiment, the electrically insulating barrier is designed to secure the rails of the rail system in a fixed position, the electrically insulating barrier being provided with bushings which closely surround the rails, and a connection opening for making electrical connection to the branch being provided for each phase. In this case too, it is preferable to use flexible liners, by means of which the rails are mounted on the electrically insulating barrier reliably in both mechanical and electrical terms.

As a result of the optimization of the compactness and as a result of the consequently smaller space surrounded by the electrically insulating barrier, the heat which is generated by the current passing through the switching installation will cause the maximum limits set to be exceeded at an earlier stage. Therefore, in a further embodiment of the electrically insulating barrier, the latter is provided with at least one opening, allowing hot air to be exchanged with ambient air through convection. This opening is selected in such a manner that it does not detract from the electrically insulating properties of the barrier in any way.

In a further aspect, the present invention relates to a switching installation provided with an electrically insulating barrier, the circuit breaker, its actuating member and a drive mechanism for the circuit breaker preferably being positioned in a straight line in a first direction (for example vertically, the y direction), and the rails of the rail system extending in a second direction which is substantially perpendicular to the first direction (for example horizontally, the x direction). This enables the switching installation to be of more compact structure, since there is no need for any additional transmission means for actuation of the circuit breaker and the like.

In a further embodiment, the disconnector between circuit breaker and rails, in the closed state, extends in a third direction (the z direction) which is substantially perpendicular to both the first and second directions (and therefore in this example also extends in the horizontal plane), in which case it is possible for the disconnector to be switched into an open state or a grounded state by being rotated. This measure too ensures that the switching installation is of compact and operationally reliable structure and also enables the second, mechanical and design function of the electrically insulating barrier to be exploited still further.

For this purpose, in yet another embodiment, the electrically insulating barrier is designed to guide the disconnector between a first position, in which the disconnector makes contact with the phase rail, a second position, in which the disconnector does not make any contact with the phase rail, and optionally a third position, in which the disconnector makes contact with a ground contact. This can be implemented, for example, by means of movement guides in the form of curved slots or edges on the inner side of the electrically insulating barrier which interact with guide pins attached to the disconnector. This allows defined and therefore secure and operationally reliable guidance of the disconnector with actuation by means of a single drive rod. This also prevents lateral deviation of the disconnector through the side walls of the electrically insulating barrier, with the result that, despite the relatively great length of the disconnector, the latter nevertheless makes correct contact with the branch or the ground contact.

In a further embodiment, advantageous use is made of the mechanical and design function of the electrically insulating barrier according to the invention to secure a branch rail to the corresponding phase rail of the rail system in a fixed position, one side of the branch rail being designed to make breakable contact with that end of the disconnector which is remote from the switching component, for example a vacuum circuit breaker. For each phase in a switching installation it is generally necessary to make a connection to one of the rails of the three-phase rail system. By making use of securing means for branch rails in the electrically insulating barrier, it is possible to design it in an environmentally friendly way with a high degree of flexibility and uniformity.

BRIEF DESCRIPTION OF THE DRAWINGS

The present invention will now be explained in more detail on the basis of a number of exemplary embodiments and with reference to the drawings, in which:

FIG. 2 shows a side view of an electrically insulating barrier according to a further embodiment of the present invention;

FIG. 3 shows a plan view of the electrically insulating barrier shown in FIG. 2;

FIG. 4 shows a front view of the electrically insulating barrier shown in FIG. 2.

DESCRIPTION OF THE PREFERRED EMBODIMENTS

Figure 1:
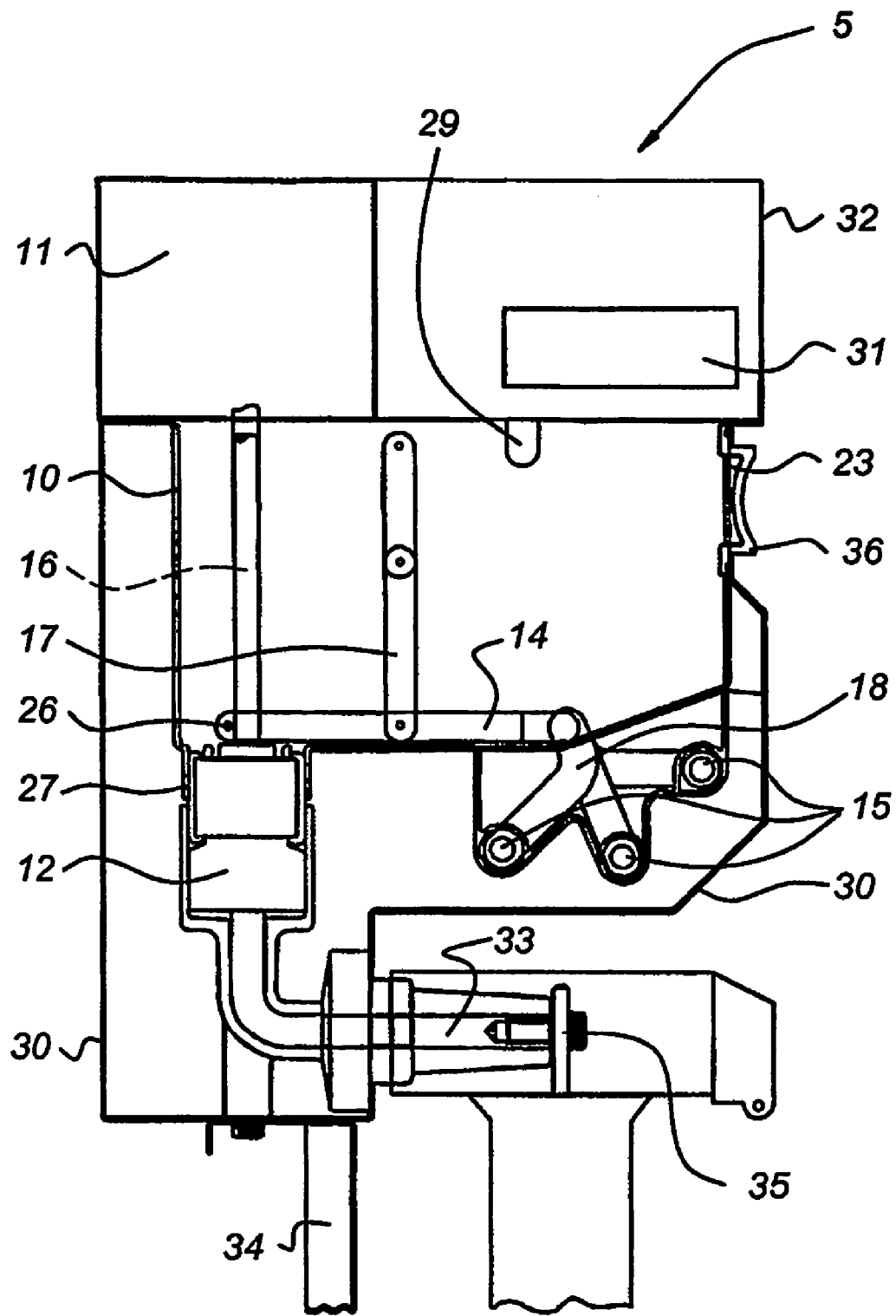
FIG. 1 shows a simplified cross-sectional view through a switching installation in which there is an electrically insulating barrier according to one embodiment of the present invention.

FIG. 1 shows a simplified cross-sectional view through an electrical switching installation 5 for medium or high voltage, in which an electrically insulating barrier 10 according to the invention is used. The switching installation 5 comprises a closed casing 30 made from metal, inside which the elements of the switching installation 5 are located. The casing 30 is mounted on a securing frame 34. In the example shown, the switching installation 5 is used to make or break an electrical connection between a power supply line 35, which is connected to a cable connection 33, and one of the rails 15 of a three-phase rail system. A conductor leads from the cable connection 33 to a bottom connection of a circuit breaker 12, in the form of a vacuum circuit breaker, which is actuated by a drive rod 16. In the switching installation 5, the circuit breaker 12 is used to switch currents on and off. The other connection of the circuit breaker 12 is connected, in the example shown, via a sliding electrically conductive connection, to a first side of a disconnector 14 which is actuated by a drive rod 17. The sliding electrically conductive connection means that there is electrical contact between circuit breaker 12 and disconnector 14 irrespective of the position of the circuit breaker 12 and the disconnector 14. In the closed position, the other side of the disconnector 14 is in contact with a branch rail 18, which is connected to one of the rails 15 which extends perpendicular to the plane of the drawing. The disconnector 14 can also electrically disconnect the conduction path between cable connection 33 and rails 15 by means of the drive rod 17. The disconnector 14 can also be brought into contact with a ground contact 29, so that the entire electric circuit from circuit breaker 12 can be grounded. The drive rods 16, 17 for the circuit breaker 12 and disconnector 14, respectively, are operated by a drive mechanism 11 which is located on the top side of the closed casing 30 indicated by a thick line in FIG. 1. In addition to this mechanism 11, on the top side of the casing 30 there is also a space for secondary equipment 31 (such as safety, measuring and recording equipment) and a control panel 32.

FIG. 1 shows a cross-sectional view which only shows one phase section of a switching installation 5. It will be clear to the person skilled in the art that the other two phase sections of the switching installation 5 are located in the direction perpendicular to the plane of the drawing, the corresponding branch rail 18 then in each case being connected to a different rail 15 of the rail system. The three phase sections together form a functional unit, also referred to as a field. Therefore, for a complete switching installation 5, a plurality of functional units can be positioned next to one another.

As a result of the circuit breaker 12, drive rod 16 and drive mechanism 11 being positioned in a vertical line and of the rails 15 of the rail system being positioned in a horizontal direction, with the disconnector 18 extending in a direction which is perpendicular to these two directions, it is possible to achieve a very compact structure of the switching installation 5.

The top side of the circuit breaker 12, its drive rod 16, the disconnector 14 and its drive rod 17 and the branch rail 18, ground contact 29 and sections of the rail 15 are surrounded, in the embodiment illustrated, by an electrically insulating barrier 10 which is used for dielectric separation (or insulation) with respect to the adjacent phases and with respect to the closed casing 30. The electrically insulating barrier 10 therefore serves as an electrically insulating barrier. For this reason, the electrically insulating barrier 10 is made from an insulating material, for example an insulating plastic.

If the electrically insulating barrier 10 is made from a transparent insulating plastic, it is possible to allow visual inspection of the position of the circuit breaker 12 and disconnector 14 via a viewing window 23, directly or via the position of the drive rods 16, 17. This viewing window 23 can be made, for example, by making a hole in the closed casing 30 at the front, just below the control panel 32. As shown in the embodiment illustrated in FIG. 1, the viewing window 23 can be protected by a further transparent window 36 which offers additional protection against the possibility of the electrically insulating barrier 10 bursting open (at the viewing window 23) in the event of a sudden occurrence of a high pressure inside the switching installation 5. Although in practice this will scarcely ever occur, for safety reasons it is necessary to take account of the possibility of such a high pressure resulting from an internal arc.

Figure 5:
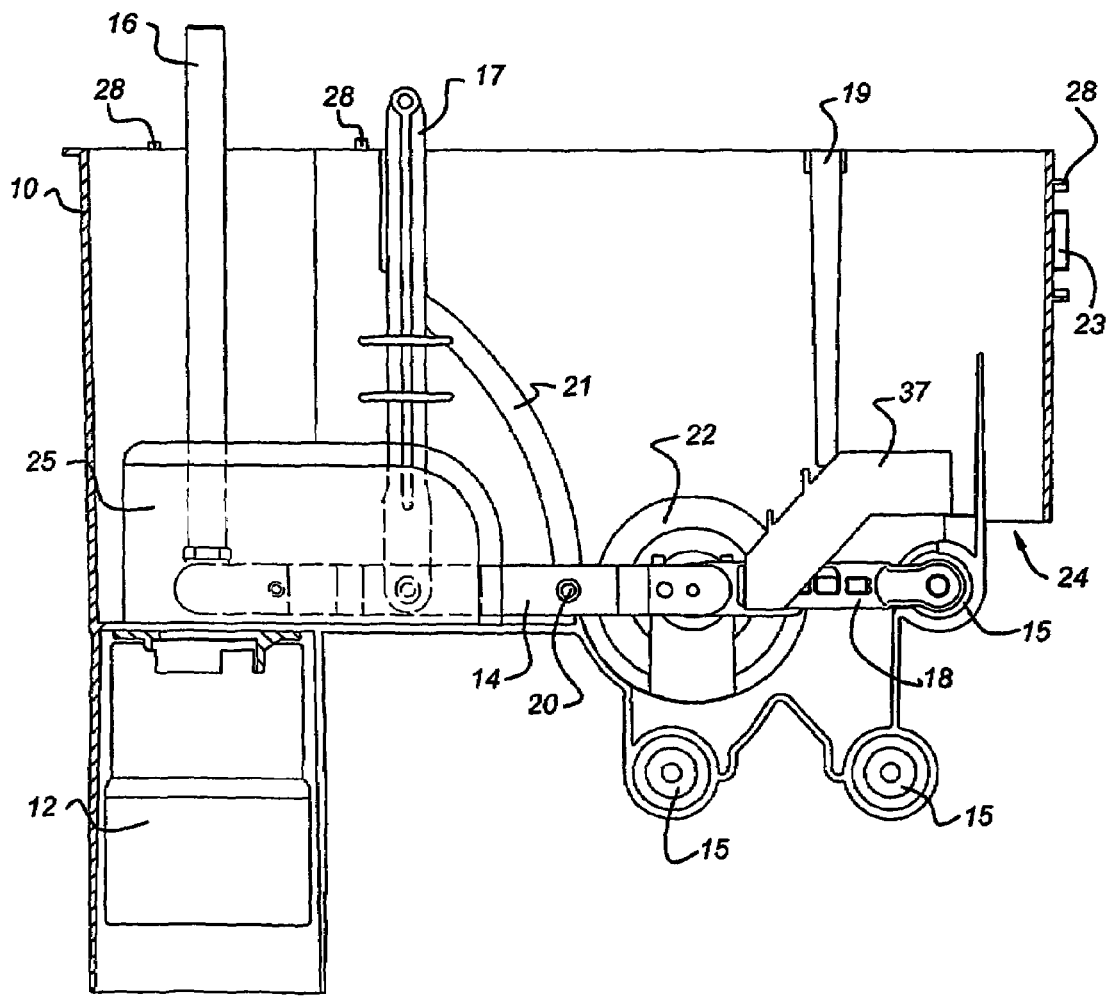
FIG. 5 shows a cross-sectional view through the electrically insulating barrier shown in FIG. 2 in which there are a number of elements of the switching installation.

In addition to the abovementioned dielectric function and visual inspection function of the electrically insulating barrier 10, if a correct choice of material is made, the electrically insulating barrier 10 can also be used for various mechanical functions, for example for securing elements of the switching installation 5. This is explained below with reference to the side, top and front views of the electrically insulating barrier shown in FIGS. 2, 3 and 4, which do not show any elements of the switching installation 5. FIG. 5 shows a cross-sectional view through the electrically insulating barrier 10 with elements of the switching installation 5 positioned therein.

The electrically insulating barrier 10 itself is secured in the switching installation 5 at a number of points. On the underside, the electrically insulating barrier 10 is provided with an opening 27 (FIGS. 1, 2 and 4) which fits accurately onto the top section of the circuit breaker 12, optionally using a closely fitting (rubber) liner (not shown), with the result that a voltage-sealing closure is then also obtained. The circuit breaker 12 is secured to the frame 34 by means of a molded piece (FIG. 1) and thereby forms a solid support for the electrically insulating barrier. The viewing window 23 may be shaped in such a manner that it forms a securing point with respect to the closed casing 30. Furthermore, the electrically insulating barrier 10 is provided with a number of securing points (for example projecting lugs) 28 for securing it to the drive mechanism 11 and a number of securing points 28 for securing the electrically insulating barrier 10 to the closed casing 30. The respective components are then provided with holes or recesses for receiving the securing points 28. In addition, the electrically insulating barrier 10 comprises receiving parts 40 for the rails 15 of the rail system. These are preferably shaped so as to receive the rails in their entirety over the width of the electrically insulating barrier 10 and are provided with an opening for securing the branch rails 18 to one of the rails 15. According to the invention, the rails 15 are secured in the receiving parts 40 with the aid of rubber liners. In this way, securing which is both mechanical and has a voltage-sealing action at the location of the opening for the connection of the branch rails 18 is obtained. After a number of electrically insulating barriers 10 have been assembled to form a functional unit in the switching installation 5, the rails 15, which extend over a plurality of disconnector housings 10, are also responsible for mechanical securing, positioning and coupling of the electrically insulating barriers inside said functional unit.

On the inner side, the electrically insulating barrier 10 is provided with various mechanical measures for securing and/or guiding elements from the switching installation 5. The most important of these relate to the action of the disconnector 14. The latter may be in a closed position, in which there is an electrical connection between the top connection of the circuit breaker 12 and the branch rails 18. On the side of the circuit breaker 12, the disconnector 14 can rotate about a pivot point 26 (cf. FIG. 1), driven by a drive rod 17. To provide good guidance for the disconnector 14, the latter is provided with two guide pins 20 which are perpendicular to the disconnector 14 and are guided in two curved grooves 21 (FIG. 5) which are located on the inner side of the electrically insulating barrier 10. Of course, as an alternative to grooves 21 it is also possible to use upright ribs in combination with slots which interact with them in the disconnector. As a result, the fact that guidance is provided both in the direction of movement and in the direction perpendicular to it means that there is a clearly mechanically defined path for the end of the disconnector 14 between branch rail 18 and ground contact 29.

The branch rail 18 is also secured at the electrically insulating barrier 10. Depending on the switching layout of the switching installation 5, the branch rail 18 has to be electrically connected to one of the rails 15. In the embodiment shown, this is effected by means of two plastic parts 19 (FIG. 5) which fix the branch rail 18. The plastic parts 19 are secured in the electrically insulating barrier 10 by a plug-fit connection formed by two recesses 41 on two inner sides of the electrically insulating barrier 10 (cf. FIGS. 2 and 3).

On the inner side of the electrically insulating barrier 10, two disk-like field-controlling shields 22 (FIG. 5) are also mounted on either side of and at the location of the breakable contact between disconnector 14 and branch rail 18. The disk-like shield 22 comprises a metal disk positioned in a holder made from insulating material; it is necessary for at least part of that side of the metal disk which faces the disconnector 14 and the branch rail 18 to remain uncovered, with the result that this disk can remain at the same potential as the branch rail 18 for the purpose of the field-controlling action. The holder is secured at the correct position, for example in a groove 42 in the electrically insulating barrier 10. The shields 22 are responsible for electric field control and voltage shielding of conductive parts with respect to adjacent phase parts of the switching installation 5 and with respect to the possibly open disconnector 14. There will sometimes be a high voltage on the conductive parts at this location and sometimes no voltage or ground potential. The shields 22 mean that there is a sufficient field-controlling shield with respect to adjacent phase parts of the switching installation 5 and with respect to the possibly open disconnector 14.

A further field-controlling voltage shield 25 is positioned at the location of the connection of the drive rods 16, 17 to the circuit breaker 12 and the disconnector 14, respectively. It can be seen from FIG. 2 that the electrically insulating barrier 10 has a securing means 43 on the top side of the location at which the circuit breaker 12 is positioned in the assembled state. The securing means 43 is in the form of a raised edge and surrounds an opening 44 (cf. FIG. 3) through which, in operation, the top connection of the circuit breaker 12 and the drive rod 16 project. The further field-controlling voltage shield 25 can be fixed to the securing means 43. In this case too, considerable voltage variations may occur, for example as a result of an open disconnector, requiring additional shielding.

Above the branch rail 18 there is a voltage shield 37, which is secured in the recesses 41 on the inner side of the electrically insulating barrier 10. The voltage shield 37 is made from material with good electrically insulating properties and, by being shaped in a suitable way, can lengthen the creeping path for free electrons past the insulating surface and can guide these electrons in such a manner that ultimately they become trapped in the field-free space between the field-controlling means. Furthermore, suitable shaping also allows the voltage-shielding function of the invention to be combined with a number of mechanical functions, such as that of retaining both the branch rail and the field-controlling means 22 in a fixed position and of accommodating an electrically conductive spring contact between the metal part of the field-controlling means 22 and the branch rail 18. The plastic parts 19 in turn fix the voltage shield 37 in position in the electrically insulating barrier 10.

The field-controlling voltage shields 25 and 22 ensure a good field distribution within the electrically insulating barrier 10, so that the installation can be of compact design. The field-controlling voltage shields 22 and 25 preferably comprise a metal part surrounded by an insulating layer. The insulating layer makes it possible for said field-controlling voltage shields to be positioned closer together, which makes a further contribution to the design being as compact as possible.

The electrically insulating barrier 10 can fulfil yet a further function by being provided with openings 24 on the side close to the rails 15 and on the top side at the connection to the drive mechanism 11. These openings enable an air flow to form through the electrically insulating barrier 10, which dissipates the heat which is generated in the electrically insulating barrier 10 as a result of the electric current passing through the electric conductors (such as circuit breaker 12, disconnector 14). Obviously, the openings 24 should be positioned in such a manner that they do not have any adverse effect on the dielectric quality of the electrically insulating barrier. Any fault or short circuit within the electrically insulating barrier 10 or between the phases is absorbed by the closed casing 30, and consequently there is no danger to staff working on the operating side of the switching installation 5.

The present invention has been illustrated on the basis of (simplified) embodiments illustrated in the figures. It will be clear to the person skilled in the art that numerous variations and modifications are possible within the inventive concept of the present invention.

For example, in the figures the electrically insulating barrier is shown with an open top side. This is not a problem if the distance between voltage-carrying parts in the electrically insulating barrier and this top side is sufficiently great to prevent an electrical sparkover. If it is desired, for example, to further increase the compactness and therefore to reduce this distance, the electrically insulating barrier according to the invention may be provided with an electrically insulating enclosure plate on the top side. In order for it then still to be possible to make a connection to a ground contact on the top side, it may be provided with a closeable shielding cap.

These variations and modifications are deemed to lie within the scope of protection of the present invention as defined by the appended claims.

The invention claimed is:

1. A switching installation comprising a circuit breaker, which is connected to a cable connection, and optionally a disconnector for making or breaking a conductive connection between the cable connection and a rail system, and an electrically insulating barrier for shielding an element of the switching installation which is under voltage in operation, in which the electrically insulating barrier surrounds at least the parts which are under electric voltage in operation from the circuit breaker to the rail system, including a branch leading to a rail of the rail system, separately for each phase of the switching installation, and also actuating members for the circuit breaker and the optional disconnector, characterized in that the electrically insulating barrier is designed to secure the branch to one of the rails of the rail system in a fixed position, one side of the branch being designed to make breakable contact with an end of the disconnector which is remote from the circuit breaker, and in that the electrically insulating barrier comprises securing means on the inner side for receiving voltage-sealing and/or field-controlling means at the location of the branch, the securing means also being designed to receive insulating support sections for securing the branch in a fixed position and retaining the voltage-sealing and/or field-controlling means.

2. The switching installation as claimed in claim 1, in which the parts between circuit breaker and rail system, including the circuit breaker and the branch, which are positioned in the barrier and are under voltage are provided with field-control-means and/or voltage-sealing means at the locations where the highest potential differences with associated high field strength density occur and/or at the locations where the distance between parts with a high potential difference is such that sparkovers may occur.

3. The switching installation as claimed in claim 2, in which the field-control means and/or voltage-sealing means are positioned at the location where the actuating member is secured to the circuit breaker, at the location of a connection between the circuit breaker and the disconnector, at the location where the actuating member is secured to the disconnector, at the location of a breakable connection between the disconnector and the branch, at the location of a connection of the circuit breaker to the electrically insulating barrier, and/or at the location of the branch leading to the rail.

4. The switching installation as claimed in claim 2, in which the field-control means and/or voltage-sealing means are provided with an electrically insulating outer layer.

5. The switching installation as claimed in claim 1, in which the electrically insulating barrier is produced as a complete unit.

6. The switching installation as claimed in claim 1, in which the material used for the electrically insulating barrier is optically transparent.

7. The switching installation as claimed in claim 1, in which the shape of the electrically insulating barrier for securing to the circuit breaker is such that there is a close fit for securing the electrically insulating barrier to the circuit breaker.

8. The switching installation as claimed in claim 7, in which the circuit breaker and the electrically insulating barrier are secured to one another with the aid of a flexible liner.

9. The switching installation as claimed in claim 1, in which the electrically insulating barrier is provided with securing means on one or more sides.

10. The switching installation as claimed in claim 1, in which the electrically insulating barrier is designed to secure the rails of the rail system in a fixed position, the electrically insulating barrier being provided with bushings which closely surround the rails, and a connection opening for making electrical connection to the branch being provided for each phase.

11. The switching installation as claimed in claim 10, in which the bushing is provided, at least at the location of the connection opening for making electrical connection to the branch, with a rubber liner by means of which the rail is secured in the bushing in such a manner as to form a seal with respect to both electric voltages and mechanical stresses.

12. The switching installation as claimed in claim 1, in which the electrically insulating barrier is also provided with at least one opening for exchanging air with the surroundings.

13. The switching installation as claimed in claim 1, in which the circuit breaker, its actuating member and a drive mechanism for the circuit breaker are positioned in a straight line in a first direction, and the rails of the rail system extend in a second direction which is substantially perpendicular to the first direction.

14. The switching installation as claimed in claim 13, in which the disconnector between circuit breaker and rails; in the closed state, extends in a third direction which is substantially perpendicular to both the first and second directions, in which case it is possible for the disconnector to be switched to an open state by being rotated.

15. The switching installation as claimed in claim 1, in which the electrically insulating barrier is designed to guide the disconnector between a first position, in which the disconnector makes contact with the branch rail, a second position, in which the disconnector does not make any contact with the branch rail, and optionally a third position, in which the disconnector makes contact with a ground contact.

16. The switching installation as claimed in claim 3, in which the field-control means and/or voltage-sealing means are provided with an electrically insulating outer layer.

17. The switching installation as claimed in claim 2, in which the electrically insulating barrier is produced as a complete unit.

18. The switching installation as claimed in claim 3, in which the electrically insulating barrier is produced as a complete unit.

19. The switching installation as claimed in claim 4, in which the electrically insulating barrier is produced as a complete unit.

20. The switching installation as claimed in claim 2, in which the material used for the electrically insulating barrier is optically transparent.

* * * * *